(12) United States Patent
Hata et al.

(10) Patent No.: US 10,669,955 B2
(45) Date of Patent: Jun. 2, 2020

(54) ENGINE CONTROL DEVICE

(71) Applicant: MITSUBISHI JIDOSHA KOGYO KABUSHIKI KAISHA, Tokyo (JP)

(72) Inventors: Koji Hata, Tokyo (JP); Hiroki Oshima, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 85 days.

(21) Appl. No.: 16/065,225

(22) PCT Filed: Dec. 22, 2016

(86) PCT No.: PCT/JP2016/088494
§ 371 (c)(1),
(2) Date: Jun. 22, 2018

(87) PCT Pub. No.: WO2017/111086
PCT Pub. Date: Jun. 29, 2017

(65) Prior Publication Data
US 2019/0003408 A1 Jan. 3, 2019

(30) Foreign Application Priority Data

Dec. 25, 2015 (JP) .................................. 2015-253760

(51) Int. Cl.
*F02D 41/00* (2006.01)
*F02D 23/00* (2006.01)
(Continued)

(52) U.S. Cl.
CPC ......... *F02D 41/0007* (2013.01); *B60W 10/04* (2013.01); *B60W 10/06* (2013.01);
(Continued)

(58) Field of Classification Search
CPC .............. F02D 41/0007; F02D 23/005; F02M 35/10163; B60W 2710/0638
See application file for complete search history.

(56) References Cited

U.S. PATENT DOCUMENTS 7,478,533 B2 * 1/2009 Ueno .................... F02B 37/004
290/52
10,190,485 B2 * 1/2019 Yamane .................. F02B 37/04
(Continued)

FOREIGN PATENT DOCUMENTS

CN    102230418 A  * 11/2011   .............. F02B 37/04
EP    1 749 990 A2     2/2007
(Continued)

OTHER PUBLICATIONS

International Preliminary Report on Patentability and English translation of the Written Opinion of the International Searching Authority (Forms PCT/IB/373 and PCT/ISA/237) for International Application No. PCT/JP2016/088494, dated Jun. 26, 2018.
(Continued)

*Primary Examiner* — Tisha D Lewis
(74) *Attorney, Agent, or Firm* — Birch, Stewart, Kolasch & Birch, LLP.

(57) ABSTRACT

An engine includes a dynamo-electric machine which generates electricity by the rotation of the engine; a secondary battery which stores electricity generated by the dynamo-electric machine; an electric supercharger including an electric compressor for supercharging intake air into combustion chambers; and a mechanical supercharger including an exhaust turbine configured to be driven by exhaust gas in the exhaust passage, and a mechanical compressor configured to supercharge intake air into the combustion chamber. An ECU (50) includes a remaining charge detector for detecting the remaining amount of charge of the secondary battery; and a supercharge control means for adjusting the ratio
(Continued)

between a supercharging pressure by the electric supercharger and a supercharging pressure by the mechanical supercharger according to the remaining amount of charge of the secondary battery.

12 Claims, 5 Drawing Sheets

(51) Int. Cl.
```
F02M 35/10      (2006.01)
B60W 20/19      (2016.01)
B60W 10/06      (2006.01)
B60W 10/10      (2012.01)
F02B 37/18      (2006.01)
B60W 10/04      (2006.01)
B60W 30/188     (2012.01)
F02B 37/10      (2006.01)
F02B 39/10      (2006.01)
B60W 20/30      (2016.01)
F02B 41/10      (2006.01)
F02D 41/18      (2006.01)
F02B 39/16      (2006.01)
F02D 41/04      (2006.01)
```
(52) U.S. Cl.
CPC ............ *B60W 10/10* (2013.01); *B60W 20/19* (2016.01); *B60W 20/30* (2013.01); *B60W 30/1882* (2013.01); *F02B 37/10* (2013.01); *F02B 37/105* (2013.01); *F02B 37/18* (2013.01); *F02B 39/10* (2013.01); *F02B 41/10* (2013.01); *F02D 23/00* (2013.01); *B60W 2510/0638* (2013.01); *B60W 2510/244* (2013.01); *B60W 2540/10* (2013.01); *B60W 2710/0638* (2013.01); *B60W 2710/083* (2013.01); *F02B 2039/168* (2013.01); *F02D 41/045* (2013.01); *F02D 41/18* (2013.01); *F02D 2200/0406* (2013.01); *F05D 2220/40* (2013.01); *Y02T 10/144* (2013.01)

(56) References Cited

U.S. PATENT DOCUMENTS

| | | | |
|---|---|---|---|
| 10,197,003 B2* | 2/2019 | Takayanagi | .......... F02B 37/013 |
| 2009/0107142 A1 | 4/2009 | Russell et al. | |
| 2016/0230648 A1* | 8/2016 | Sanchez Perez | ... F02D 41/0007 |
| 2016/0251011 A1 | 9/2016 | Hata | |
| 2016/0265422 A1 | 9/2016 | Yamashita et al. | |
| 2016/0265468 A1 | 9/2016 | Takayanagi et al. | |
| 2017/0145906 A1* | 5/2017 | Tomita | .................. F02D 41/18 |
| 2017/0328272 A1* | 11/2017 | Yamashita | .............. F02B 37/24 |

FOREIGN PATENT DOCUMENTS

| | | | |
|---|---|---|---|
| JP | 3-246323 A | 11/1991 | |
| JP | 6-323155 A | 11/1994 | |
| JP | 2004-293442 A | 10/2004 | |
| JP | 2005-163674 A | 6/2005 | |
| JP | 2014-169646 A | 9/2014 | |
| JP | 2015-108330 A | 6/2015 | |
| WO | WO 2015/083611 A1 | 6/2015 | |
| WO | WO 2015/186543 A1 | 12/2015 | |
| WO | WO-2016121092 A1 * | 8/2016 | .............. F02B 37/24 |

OTHER PUBLICATIONS

International Search Report (Form PCT/ISA/210) for International Application No. PCT/JP2016/088494, dated Mar. 21, 2017.
Extended European Search Report issued Nov. 27, 2018 in corresponding European Application No. 16878972.5.
Chinese Office Action dated Nov. 22, 2019, for corresponding Chinese Patent Application No. 201680075585.0, with English translation.
Japanese Office Action dated Nov. 19, 2019, for corresponding Japanese Patent Application No. 2015-253760, with English translation.

* cited by examiner

ENGINE CONTROL DEVICE

TECHNICAL FIELD

The present invention relates to an engine control device including an electric supercharger for supercharging intake air by means of an electric motor, and a mechanical supercharger for recovering exhaust gas energy with a turbine and supercharging intake air.

BACKGROUND ART

Many engines are equipped with a mechanical supercharger for supercharging intake air introduced into a combustion chamber or chambers utilizing exhaust gas energy.

This type of mechanical supercharger is also known as a turbocharger. A turbocharger includes a compressor disposed at an intermediate portion of the intake passage of an engine, and a turbine disposed at an intermediate portion of the exhaust passage, and configured such that the compressor is activated due to the rotation of the turbine by exhaust gas flowing through the exhaust passage, to increase the amount of intake air introduced into the combustion chamber(s), thereby increasing the engine torque.

Besides superchargers utilizing exhaust gas energy, various types of electric superchargers, which include a compressor and an electric motor for driving the compressor, have been proposed in recent years. Such an electric supercharger is advantageous in that it is possible to arbitrarily supercharge intake air by supplying electric power irrespective of the operating state of the engine (see, for example, the below-identified Patent Document 1).

A mechanical supercharger that utilizes exhaust gas energy includes a wastegate valve for adjusting the amount of exhaust gases into the turbine by partially diverting exhaust gases. By adjusting the amount of exhaust gases that pass through the turbine with the wastegate valve, it is possible to control the supercharging pressure of intake air.

Older wastegate valves were controlled by pneumatic actuators driven by the supercharging pressure. In recent years, electronically controlled wastegate valves which are selectively opened and closed by an electric motor are also used. By electronically controlling the wastegate valve, it can be controlled even while the supercharging pressure is low, and it can also be more precisely controlled.

Since large electric power is required to drive an electric supercharger, it is preferable to power such an electric supercharger using regenerative power generated while the vehicle on which the engine having the supercharger is mounted is decelerating.

The below-identified Patent Document 2 discloses a technology for increasing the amount of regenerated energy.

That is, in Patent Document 2, the actuation of a wastegate valve is controlled according to the amount of regenerated energy generated while the vehicle is decelerating. In particular, while the vehicle is decelerating and the remaining amount of charge of the battery is low, the alternator as a dynamo-electric machine regenerates electricity. This opens the wastegate valve, thus reducing the amount of exhaust gases introduced into the turbine, so that it is possible to reduce the pressure of the exhaust gases discharged from the combustion chamber(s) into the exhaust passage.

The reduced exhaust gas pressure results in reduced pumping loss, which in turn results in reduced engine braking power due to reduced revolving resistance of the engine. This makes it possible to efficiently utilize the kinetic energy of the vehicle for the regeneration of electricity.

PRIOR ART DOCUMENTS

Patent Documents

Patent Document 1: JP Patent Publication 2005-163674A
Patent Document 2: JP Patent Publication 2014-169646A

SUMMARY OF THE INVENTION

Object of the Invention

Generally speaking, an electric supercharger consumes a considerable amount of electric power, and the amount of electric power which can be supplied to the electric supercharger is limited even if electricity is regenerated. Thus, it is necessary to transfer the supercharging source from the electric supercharger to the mechanical supercharger at some point of time after the start of the electric supercharger.

However, since the operating range of the engine in which the electric supercharger can perform supercharging is different from the operating range of the engine in which the mechanical supercharger can perform supercharging, it is necessary, when transferring the supercharging source, to control the respective superchargers such that they show maximum performance according to the operating range of the engine.

However, there exists no prior art publications that teaches what extent of supercharging pressure should be transferred at what stage from the electric supercharger to the mechanical supercharger in order for the respective superchargers show maximum performance.

An object of the present invention is to allow the electric supercharger and the mechanical supercharger to show maximum performance when transferring the supercharging source for supercharging intake air from the electric supercharger to the mechanical supercharger.

Means for Achieving the Object

In order to achieve this object, the present invention provides an engine control device for controlling an engine including a combustion chamber, an intake passage, and an exhaust passage, the engine control device comprising: a dynamo-electric machine configured to generate electric power by rotation of the engine; a secondary battery configured to store the electric power generated by the dynamo-electric machine; an electric supercharger including an electric compressor disposed in the intake passage and configured to supercharge intake air into the combustion chamber by the electric power stored in the secondary battery; and a mechanical supercharger including an exhaust turbine disposed in the exhaust passage and configured to be driven by exhaust gas in the exhaust passage, and a mechanical compressor disposed in the intake passage and configured to supercharge intake air into the combustion chamber. The engine control device further comprises: a remaining charge detecting means configured to detect a remaining amount of charge of the secondary battery; and a supercharge control means configured to adjust the ratio between a supercharging pressure by the electric supercharger and a supercharging pressure by the mechanical supercharger according to the remaining amount of charge of the secondary battery.

The engine may further include an exhaust bypass passage connecting portions of the exhaust passage upstream and downstream of the exhaust turbine, and an exhaust bypass valve configured to selectively open and close the exhaust bypass passage. In this arrangement, the supercharge control means is configured to control the degree of opening of the exhaust bypass valve according to the remaining amount of charge of the secondary battery.

The supercharge control means may be configured to determine the degree of opening of the exhaust bypass valve based on the difference between a target supercharging pressure of intake air and the supercharging pressure by the electric supercharger.

The supercharge control means may be configured to reduce the supercharging pressure by the electric supercharger and increase the supercharging pressure by the mechanical supercharger when the remaining amount of charge of the secondary battery falls below a predetermined amount of charge while the electric supercharger is being activated.

The engine control device may further comprise an operating state control means configured to control the revolving speed of the engine and a load of the engine with reference to an equi-output curve where an output of the engine does not change, while the ratio between the supercharging pressure by the electric supercharger and the supercharging pressure by the mechanical supercharger is changing.

The present invention also provides a vehicle comprising the engine control device that includes the above-described operating state control means; an engine configured to be controlled by the engine control device; and a transmission configured to change a speed reduction ratio of the output of the engine. The operating state control means is configured to control the speed reduction ratio as the revolving speed of the engine and the load of the engine change along the equi-output curve.

Advantages of the Invention

According to the present invention, since the ratio between the supercharging pressure by the electric supercharger and the supercharging pressure by the mechanical supercharger are adjusted according to the remaining amount of charge of the secondary battery, it is possible, during supercharging with the electric supercharger, to perform maximum supercharging operation with the electric supercharger within a range in which the secondary battery is not exhausted, by monitoring the remaining amount of charge of the secondary battery, and when the remaining amount of charge of the secondary battery becomes low, it is possible to efficiently transfer the supercharging source from the electric supercharger to the mechanical supercharger. Thus, it is possible to control the respective superchargers such that they show maximum performance.

EMBODIMENT OF THE INVENTION

Figure 1:
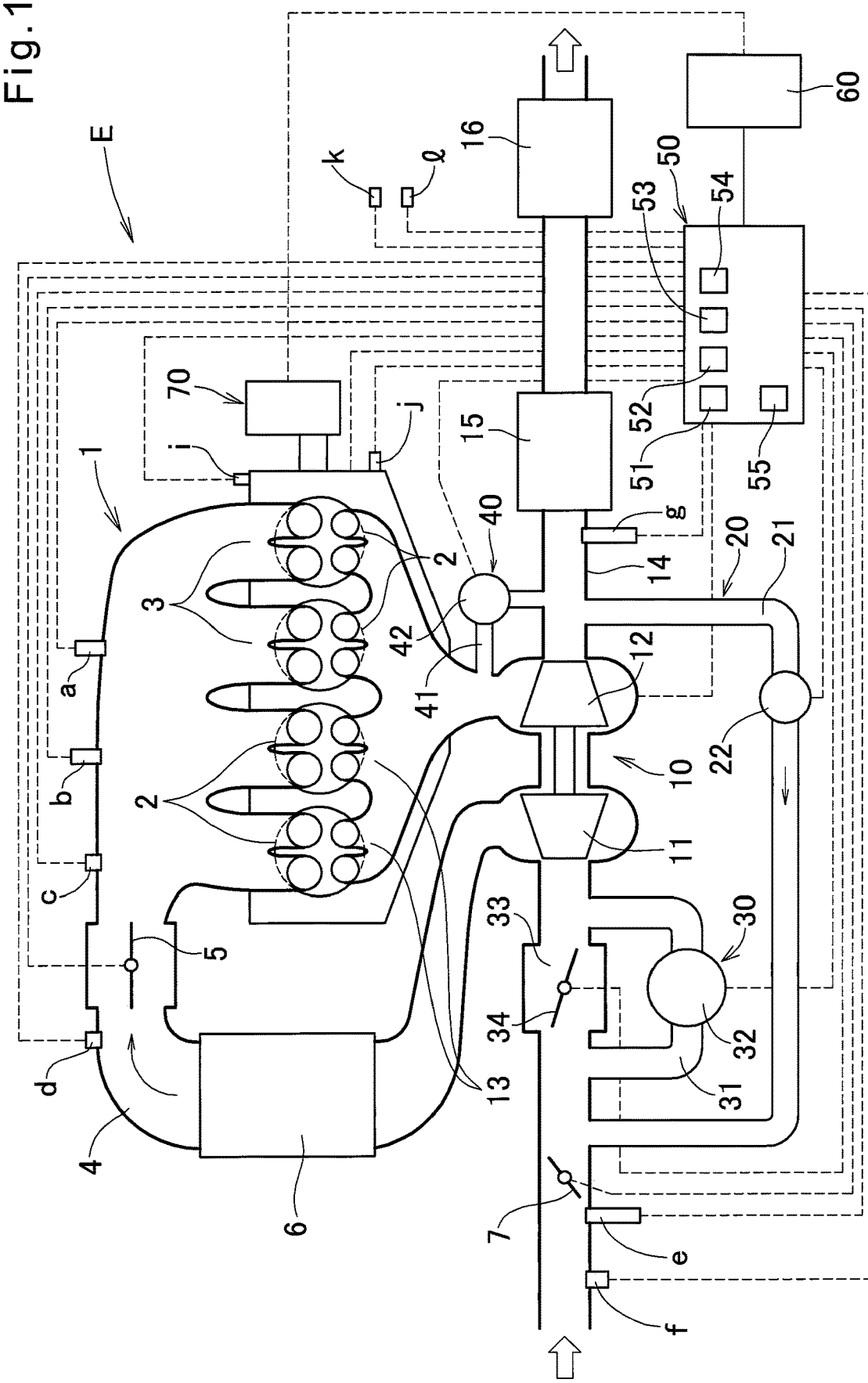
FIG. 1 schematically shows an engine control device embodying the present invention.

An embodiment of the present invention is described with reference to the accompanying drawings. FIG. 1 schematically shows an entire system E including an engine and a control device thereof embodying the present invention.

The engine 1 of the embodiment is a four-cycle internal combustion gasoline engine for use in an automobile. Referring to FIG. 1, the engine 1 includes intake ports 3 through which air is fed into respective cylinders 2 defining combustion chambers therein, an intake passage 4 communicating with the intake ports 3, exhaust ports 13, an exhaust passage 14 extending from the exhaust ports 13, and fuel injection devices configured to inject fuel into the intake ports 3 or into the combustion chambers. The intake ports 3 and the exhaust ports 13 are opened and closed by respective valves.

The engine of the embodiment is a four-cylinder engine, i.e., an engine comprising four cylinders, but the present invention is applicable to an engine comprising any number of cylinders.

The intake passage 4 communicates with the combustion chamber through the intake ports 3. Disposed in the intake passage 4 are, in the upstream direction from the intake ports 3, a first throttle valve 5 configured to adjust the area of the flow passage toward the intake ports 3; an intake air cooling device (intercooler) 6 configured to cool intake air flowing through the intake passage 4; and a mechanical compressor 11 of a mechanical supercharger (turbocharger) 10. Further upstream, a second throttle valve 7 configured to adjust the flow passage area, and an air cleaner (not shown) are disposed in the intake passage 4.

The exhaust passage 14 communicates with the combustion chambers through the exhaust ports 13. Provided in the exhaust passage 14 are, in the downstream direction from the exhaust ports 13, an exhaust turbine 12 of the mechanical supercharger 10; an exhaust purifier 15 including a catalyst for removing e.g., unburned hydrocarbons (HC) in the exhaust; and a muffler 16.

As shown in FIG. 1, the mechanical compressor 11 of the mechanical supercharger 10, disposed in the intake passage 4, is coaxially coupled to the exhaust turbine 12 of the mechanical supercharger 10, disposed in the exhaust passage 14, such that, when the exhaust turbine 12 is rotated by the exhaust gas flowing through the exhaust passage 14, its rotation is transmitted to the mechanical compressor 11, and the rotating mechanical compressor 11 supercharges the intake air flowing through the intake passage 4 into the combustion chambers.

The engine 1 further includes an exhaust bypass device 40 (generally known as a "wastegate") comprising an exhaust bypass passage 41 connecting the portions of the exhaust passage 14 upstream and downstream of the exhaust turbine 12, and an exhaust bypass valve 42 configured to selectively open and close the exhaust bypass passage 41. When the exhaust bypass valve 42 is open, part of the exhaust gas flowing toward the exhaust turbine 12 is diverted into the exhaust bypass passage 41, and the exhaust energy acing on the exhaust turbine 12 decreases.

In this embodiment, the exhaust bypass valve 42 is an electronically controlled wastegate valve selectively opened and closed by an electric motor.

An electric supercharger 30 is disposed at an intermediate portion of the intake passage 4. The electric supercharger 30 includes an electric compressor 32 disposed at the intake passage 4 and configured to supercharge air into the combustion chambers. In particular, when the electric compressor 32 is energized and driven, the electric compressor 32 supercharges the air flowing through the intake passage 4.

The intake passage 4 includes an intake bypass passage 33 connecting the upstream side and the downstream side of the electric compressor 32. An intake bypass valve 34 is disposed in the intake bypass passage 33 to selectively open and close the intake bypass passage 33.

Electric power for driving the exhaust bypass valve 42 and the electric compressor 32 is supplied from a battery 60 that also supplies power to other components of the engine 1, as well as to all the other electric components of the vehicle on which the engine 1 is mounted. However, a separate battery, i.e., a battery other than the battery 60, may be used to supply electric power for driving the exhaust bypass valve 42 and the electric compressor 32.

A portion of the exhaust passage 14 downstream of the exhaust turbine 12 is in communication with a portion of the intake passage 11 between the mechanical compressor 11 and the second throttle valve 7 through an exhaust gas recirculation passage 21 which is part of an exhaust gas recirculation device 20. The exhaust gas leaving the combustion chamber is partially recirculated, as recirculated gas, through the exhaust gas recirculation passage 21 into the intake passage 4 upstream of the mechanical compressor 11 and the electric compressor 32. An exhaust gas recirculation valve 22 is disposed in the exhaust gas recirculation passage 21. The recirculated gas merges with the air in the intake passage 4 depending on the pressure in the intake passage 4 which is determined by the degrees of opening of the exhaust gas recirculation valve 22 and the second throttle valve 7.

The vehicle V on which the engine 1 is mounted includes an electric control unit (ECU) 50 as a control device for the engine 1.

The ECU 50 controls fuel injection by fuel injectors (not shown) at the intake ports 3 or in the combustion chambers; controls supercharging pressure; controls the degrees of opening of the throttle valve 5 and the second throttle valves 7; controls the exhaust gas recirculation device 20; and performs any other necessary control of the engine.

The ECU 50 includes a supercharge control means 52 configured to control the electric supercharger 30 and the mechanical supercharger 10; an intake bypass device control means 53 configured to control the intake bypass valve 34; and an exhaust bypass device control means 54 configured to control the exhaust bypass valve 42 of the exhaust bypass device 40. When controlling the electric supercharger 30 and the mechanical supercharger 10, the supercharge control means 52 simultaneously sends commands to the intake bypass device control means 53 and the exhaust bypass device control means 54 to operate the intake bypass valve 34 and the exhaust bypass valve 42 such that the superchargers 30 and 10 operate in the intended manner.

As shown in FIG. 1, the intake passage 4 includes a purge device a configured to temporarily store vaporized fuel in the fuel tank in e.g., a canister, and introduce it into the intake passage 4 downstream of the throttle valve 5. The intake passage 4 further includes a blowby gas recirculation device b configured to recirculate blowby gas leaked into the engine 1 which is mainly unburned gas, to the intake ports 3. A breather device e opens to the intake passage 4 upstream of the second throttle valve 7 to release the pressure in the crankcase. These devices are also controlled by the ECU 50.

The intake passage 4 is further provided with sensor devices for gathering information necessary to control the engines 1, the sensor devices including pressure sensors c and d for sensing pressures in the intake port 3 downstream and upstream of the throttle valve 5, respectively; and an air flow sensor f for sensing the amount of air flowing through the intake passage 4.

The exhaust passage 14 includes, as a sensor device for gathering information necessary to control the engine 1, an exhaust gas temperature sensor g for detecting the temperature of the exhaust gas.

The engine 1 further includes a water temperature sensor i for detecting the temperature of cooling water for cooling e.g., the cylinder block, and a rotational speed sensor j for detecting the rotational speed of the crankshaft of the engine 1. The vehicle V on which the engine 1 is mounted includes an accelerator pedal sensor k for detecting the degree of depression of the accelerator pedal, and a vehicle speed sensor l for detecting the vehicle speed.

The ECU 50 receives the information from these various sensors via cables.

During a normal operating state, the ECU 50 controls the throttle valve 5 based on the signal from the accelerator pedal sensor k such that the degree of opening of the throttle valve 5 corresponds to the degree of depression of the accelerator pedal. Based on the information from the vehicle speed sensor l, which is capable of detecting the speed of the vehicle, the ECU 50 is capable of determining whether the vehicle is e.g., accelerating, decelerating, or stopping.

The engine 1 further includes a dynamo-electric machine 70 configured to generate electricity while the engine 1 is running. In the embodiment, the dynamo-electric machine 70 as a generator comprises an alternator (and thus is hereinafter referred to as the "alternator 70").

The alternator 70 is connected to the crankshaft of the engine 1 by e.g., a belt. The alternator 70 is electrically connected to the battery 60 (which is a secondary battery capable of storing electric power) via a power supply cable. The alternator 70 generates electricity by being driven by the rotation of the crankshaft, and supplies the thus generated electricity to the headlights and other electric components of the vehicle, to devices for controlling the engine 1, and to the battery 60. The ECU 50 controls the amount of electricity generated by the alternator 70.

The ECU 50 further includes a remaining charge detecting means 51 for detecting the remaining amount of charge of the battery 60. The supercharge control means 52 is configured to adjust the ratio between the supercharging pressure by the electric supercharger 30 and the supercharging pressure by the mechanical supercharger 10 based on the remaining amount of charge of the battery 60.

The supercharging pressure of the mechanical supercharger 10 is controlled by adjusting the degree of opening of the exhaust bypass valve 42. That is, when the exhaust bypass valve 42 is closed, the energy the mechanical supercharger 10 recovers from the exhaust gas becomes maximum, so that the supercharging pressure of the mechanical supercharger 10 become maximum. However, when the exhaust bypass valve 42 is closed, the pumping loss during the exhaust stroke increases, and the thermal efficiency falls. Thus, for higher thermal efficiency, it is desired to keep the degree of opening of the exhaust bypass valve 42 as high as possible. That is, while the electric supercharger 30 is performing a supercharging operation, the superchargers 10 and 30 are controlled to achieve the target supercharging pressure while keeping the degree of opening of the exhaust bypass valve 42 as high as possible, so as to minimize the pumping loss during the exhaust stroke, and improve fuel economy.

The electric power for driving the electric supercharger 30 is supplied from the battery 60. While the vehicle is being driven by the engine, the alternator 70 generates electricity by being driving by the rotation of the crankshaft of the engine 1, and the battery 60 is charged. While the vehicle is decelerating too, since the alternator 70 regenerates electricity by being driven by the rotation of the crankshaft of the engine 1, the battery 60 is charged. However, since the electric supercharger 30 consumes a large amount of electric power, the battery 60 is incapable of supplying enough power to the electric supercharger 30, even though the alternator 70 regenerates electricity.

Thus, while the electric supercharger 30 is performing a supercharging operation, the remaining charge detecting means 51 monitors the remaining amount of charge of the battery 60, whereas the supercharge control means 52 controls the electric supercharger 30 based on the remaining amount of charge of the battery 60 to gradually slow down and stop the electric supercharger 30 before the battery 60 is exhausted and the electric supercharger 30 stops suddenly. Meanwhile, the supercharge control means 52 increases the supercharging pressure of the mechanical supercharger 10 by gradually moving the exhaust bypass valve 42 in the closing direction, so as to keep constant the air supply into the combustion chambers, thereby minimizing fluctuations in output. When activating the electric supercharger 30, the supercharge control means 52 also closes the intake bypass valve 34.

Transient control of the engine 1 from the electric supercharger 30 to the mechanical supercharger 10 is now described with reference to the flowcharts of FIGS. 2 and 3. The flow of FIGS. 2 and 3 is stored in a memory device in the ECU 50, and executed when necessary.

Figure 2:
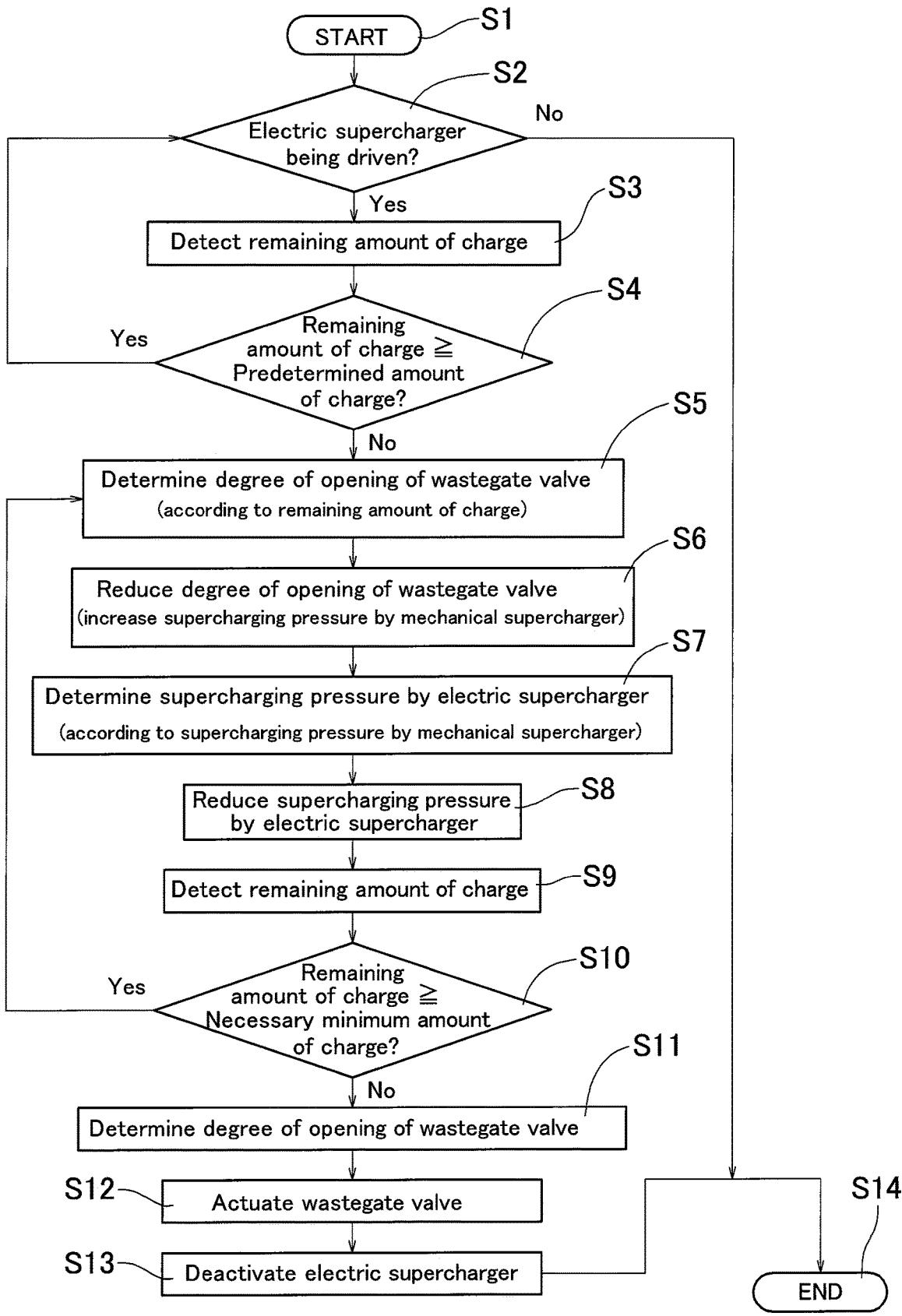
FIG. 2 is a flowchart showing the control of the engine according to this embodiment.
Figure 3:
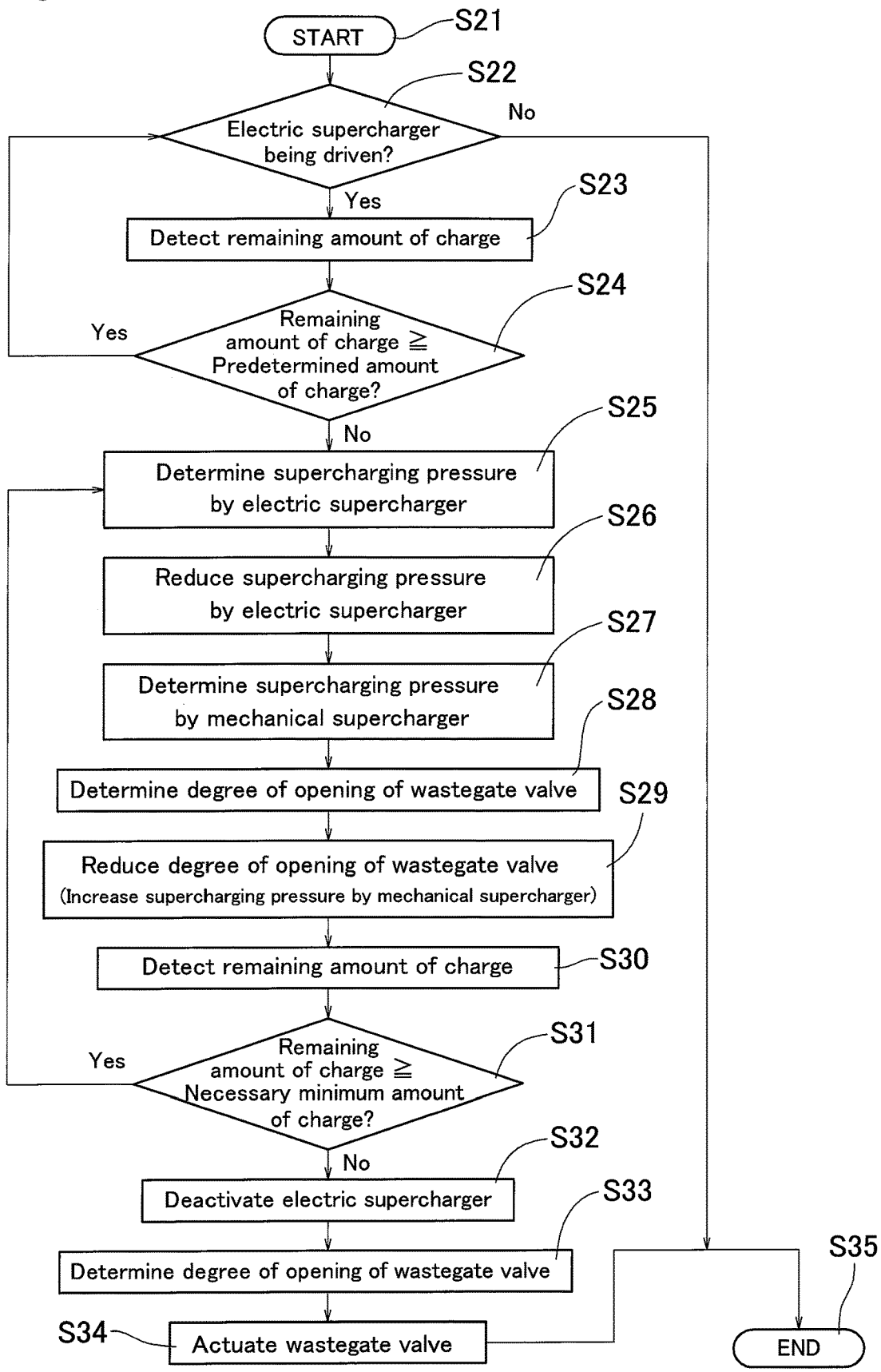
FIG. 3 is a flowchart showing the control of the engine according to this embodiment.

The control of FIG. 2 is described first. At Step S1, the ECU 50 starts the transient control from the electric supercharger 30 to the mechanical supercharger 10.

At Step S2, the ECU 50 determines whether or not the electric supercharger 30 is operating based on the commands from the supercharge control means 52. If the electric supercharger 30 is not operating, no transient control is necessary, so that the ECU 50 proceeds to Step S14, and the control ends. If the electric supercharger 30 is operating, the ECU 50 proceeds to Step S3.

At Step S3, the ECU 50 detects the remaining amount of charge of the battery 60. If at Step S4, the remaining amount of charge is not lower than a predetermined amount of charge predetermined for the battery 60, the ECU 50 determines that the operation of the electric supercharger 30 can be continued for a while without problems, and returns to Step S2. If the remaining amount of charge is lower than the predetermined amount of charge, the ECU 50 proceeds to Step S5, and performs specific measures for transferring the supercharging source from the electric supercharger 30 to the mechanical supercharger 10.

At Step S5, the ECU 50 determines the degree of opening of the exhaust bypass valve 42 based on the remaining amount of charge, specifically based on the difference between the above-mentioned predetermined amount of charge of the battery 60, or a necessary minimum amount of charge of the battery 60, and the current remaining amount of charge of the battery 60. Thus, as the remaining amount of charge decreases, the degree of opening of the exhaust bypass valve 42 is decreased correspondingly.

By way of example, as the electric supercharger 30 is driven while consuming electric power, and the remaining amount of charge of the battery 60 falls below the predetermined amount of charge, the degree of opening of the exhaust bypass valve 42 is slightly moved in the closing direction from the fully open position. The degree of opening of the exhaust bypass valve 42 at this time is determined based on the charge amount difference obtained by subtracting the current remaining amount of charge from the predetermined amount of charge. For example, the relationship between the charge amount difference and the degree of opening of the exhaust bypass valve 42 is predetermined such that, while the charge amount difference is large, the degree of opening of the exhaust bypass valve 42 is small, and while the charge amount difference is small, the degree of opening of the exhaust bypass valve 42 is large. The degree of opening of the exhaust bypass valve 42 is further predetermined such that, when the current remaining amount of charge falls below the necessary minimum amount of charge, the intake pressure by the mechanical supercharger 10 alone becomes the target supercharging pressure.

Since at Step S6, the mechanical supercharger 10 is activated as a result of the reduced degree of opening of the exhaust bypass valve 42, the ECU 50 determines, at Step S7, a new, reduced supercharging pressure by the electric supercharger 30 such that the target supercharging pressure of the intake air will not change as a result of the increased supercharging pressure by the mechanical supercharger 10. For example, the supercharging pressure by the electric supercharger 30 is set at a value equal to the difference between the target supercharging pressure and the supercharging pressure by the mechanical supercharger 10.

At Step S8, the ECU 50 actually reduces the output of the electric supercharger 30 to reduce the supercharging pressure by the electric supercharger 30 to the newly set value.

At Step S9, the ECU 50 again detects the remaining amount of charge of the battery 60. At Step S10, if the remaining amount of charge is not lower than the necessary minimum amount of charge, in order to further reduce the supercharging pressure by the electric supercharger 30, the ECU 50 returns to Step S5, and repeats the above-described subroutine. If the remaining amount of charge of the battery 60 is lower than the necessary minimum amount of charge, the ECU 50 moves to Steps S11 and S12 to adjust the degree of opening of the exhaust bypass valve 42 such that the intake pressure by the mechanical supercharger 10 increases to the target supercharging pressure, while deactivating the electric supercharger 30 at Step S13. At Step S14, the transient control ends.

The transient control of FIG. 3 is now described. At Step S21, the ECU 50 starts the transient control from the electric supercharger 30 to the mechanical supercharger 10. This control is in many respects similar to the control of FIG. 2, so that what differs from the control of FIG. 2 is mainly described below At Step S22, the ECU 50 determines whether or not the electric supercharger 30 is operating. If the electric supercharger 30 is not operating, no transient control is necessary, so that the ECU 50 proceeds to Step S35, and the control ends. If the electric supercharger 30 is operating, the ECU 50 proceeds to Step S23.

At Step S23, the ECU 50 detects the remaining amount of charge of the battery 60. If at Step S24, the remaining amount of charge is not lower than a predetermined amount of charge predetermined for the battery 60, the ECU 50 determines that the operation of the electric supercharger 30 can be continued for a while without problems, and returns to Step S22. If the remaining amount of charge is lower than the predetermined amount of charge, the ECU 50 proceeds to Step S25, and performs specific measures for transferring the supercharging source from the electric supercharger 30 to the mechanical supercharger 10.

At Step S25, the ECU 50 determines the supercharging pressure by the electric supercharger 30 based on the remaining amount of charge, specifically based on the difference between the above-mentioned predetermined amount of charge of the battery 60, or a necessary minimum amount of charge of the battery 60, and the current remaining amount of charge of the battery 60. Thus, as the remaining amount of charge decreases, the output of the electric supercharger 30 is decreased correspondingly.

By way of example, as the electric supercharger 30 is driven while consuming electric power, and the remaining amount of charge of the battery 60 falls below the predetermined amount of charge, the output of the electric supercharger 30 is slightly reduced to slightly reduce the supercharging pressure by the electric supercharger 30. At this time, the supercharging pressure by the electric supercharger 30, and the corresponding output of the electric supercharger 30 are determined based on the charge amount difference obtained by subtracting the current remaining amount of charge from the predetermined amount of charge. For example, the relationship between the charge amount difference and supercharging pressure by the electric supercharger 30 is predetermined such that, while the charge amount difference is large (i.e., the remaining amount of charge is substantially lower than the predetermined amount of charge), the supercharging pressure by the electric supercharger 30 is small, and while the charge amount difference is small (i.e., the remaining amount of charge is not substantially lower than the predetermined amount of charge), the supercharging pressure by the electric supercharger 30 is large. The ECU 50 is further configured to reduce the supercharging pressure by the electric supercharger 30 to zero, i.e., deactivate the electric supercharger 30, when the remaining amount of charge falls below the necessary minimum amount of charge.

Since at Step S26, the supercharging pressure by the electric supercharger 30 begins to decrease as a result of the reduced output of the electric supercharger 30, the ECU 50 determines, at Step S27, a new, increased supercharging pressure by the mechanical supercharger 10 such that the target supercharging pressure of the intake air will not change as a result of the reduced supercharging pressure by the electric supercharger 30. For example, the supercharging pressure by the mechanical supercharger 10 is set at a value equal to the difference between the target supercharging pressure and the supercharging pressure by the electric supercharger 30.

At Step S28, the ECU 50 determines the degree of opening of the exhaust bypass valve 42 based on the newly determined supercharging pressure by the mechanical supercharger 10. At Step S29, the ECU 50 actually reduces the degree of opening of the exhaust bypass valve 42 to the value determined at Step S28 to increase the supercharging pressure by the mechanical supercharger 10 to the newly set value.

At Step S30, the ECU 50 again detects the remaining amount of charge of the battery 60. At Step S31, if the remaining amount of charge is not lower than the necessary minimum amount of charge, in order to further reduce the supercharging pressure by the electric supercharger 30, the ECU 50 returns to Step S25, and repeats the above-described subroutine. If the remaining amount of charge of the battery 60 is lower than the necessary minimum amount of charge, the ECU 50 moves to Step S32 to deactivate the electric supercharger 30. Simultaneously, at Steps S33 and S34, the ECU 50 adjusts the degree of opening of the exhaust bypass valve 42 such that the intake pressure by the mechanical supercharger 10 increases to the target supercharging pressure. At Step S34, the transient control ends.

Description is now made of how the vehicle, on which a control system E of the engine is mounted, is controlled.

The ECU 50 of this vehicle includes an operating state control means 55 for controlling the revolving speed of the engine 1 and the engine load.

The operating state control means 55 sends information necessary to control the engine 1 to corresponding devices, based on information from various sensor devices that acquires information necessary to control the engine 1, such as pressure sensors c and d, air flow sensor f, exhaust temperature sensor g, water temperature sensor i, rotational speed sensor j, accelerator pedal sensor k, and vehicle speed sensor l, as well as various other inputs such as a request for acceleration or braking from the driver.

Figure 5:
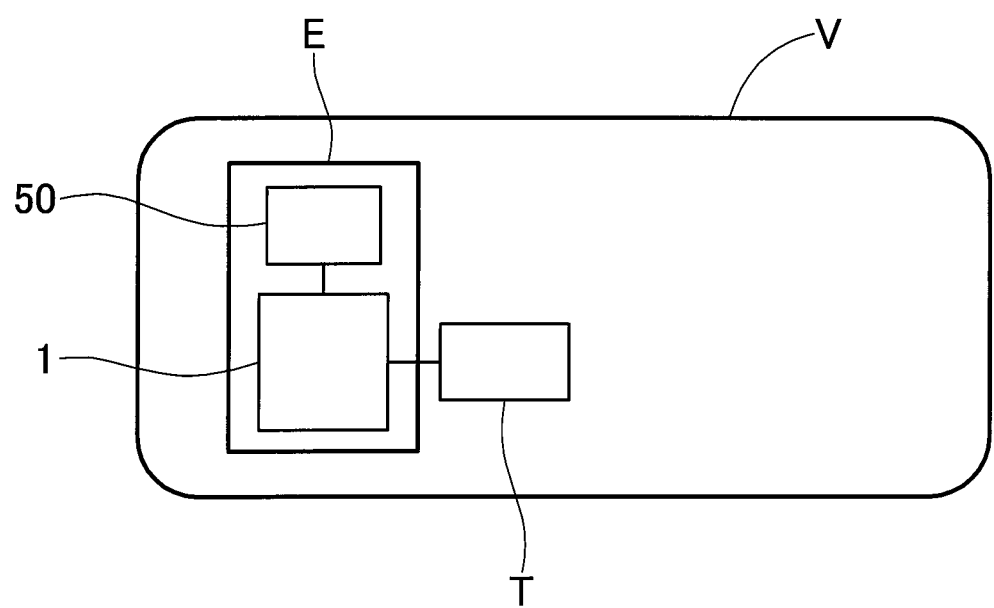
FIG. 5 schematically shows a vehicle embodying the present invention.

The vehicle V of the embodiment further includes a transmission T (see FIG. 5) capable of continuously changing the reduction ratio via a belt, a chain, or other power transmission members other than gears. The transmission T may be a stepless transmission such as a continuously variable transmission.

The transmission T has an automatic, stepless speed changing mode in which the reduction ratio is changed in a stepless manner while the driver-operated shift lever is in an automatic shift position. The transmission T is controlled based on an input signal from the driver, or automatically controlled by the operating state control means 55 based on the operating state.

Especially while the ratio between the supercharging pressure by the electric supercharger 30 and the supercharging pressure by the mechanical supercharger 10 is changing during the transient control, the operating state control means 55 performs control for reducing a sharp change in vehicle speed, a change in ride feeling, and uncomfortableness felt by the driver, due to a sharp rise in the output of the engine 1.

Figure 4:
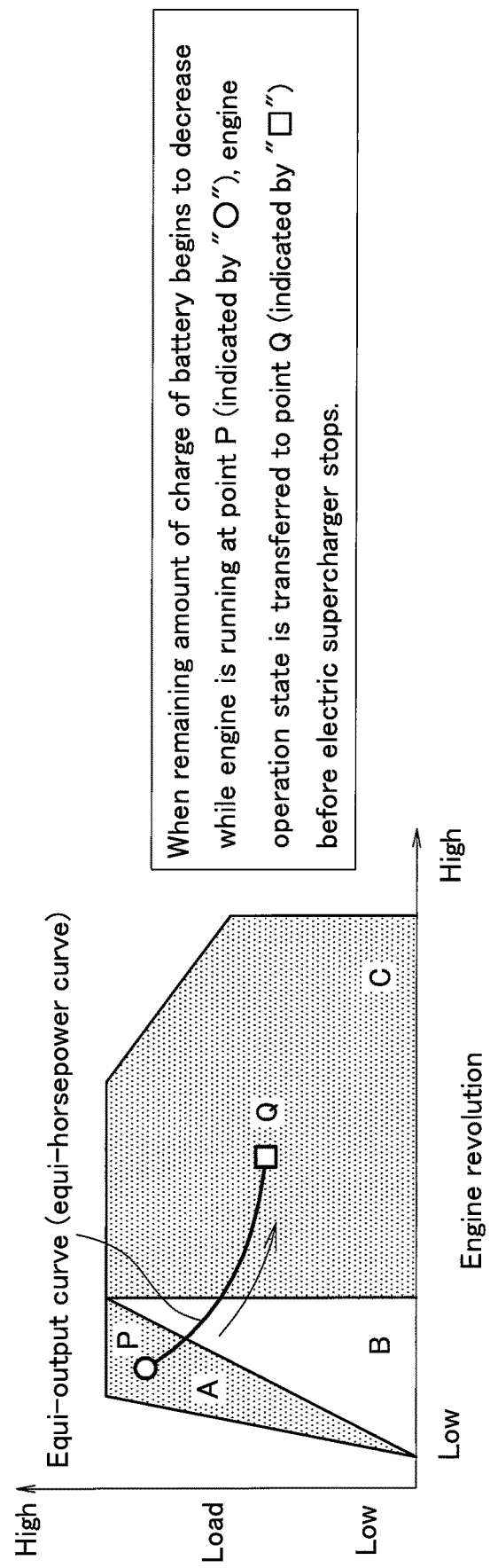
FIG. 4 is a graph showing the start of the engine according to this embodiment

Specifically, in the graph of FIG. 4, in which the horizontal axis represents the engine revolving speed and the vertical axis represents the engine torque, there are operating range A in which the electric supercharger 30 is capable of performing supercharging more efficiently than the mechanical supercharger 10; operating range B in which both the electric supercharger 30 and the mechanical supercharger 10 are capable of performing supercharging; and operating range C in which only the mechanical supercharger 10 is capable of supercharging.

Suppose now that only the electric supercharger 30 is performing supercharging at point P in operating range A. When, thereafter, the above-described transient control begins as a result of the remaining amount of charge of the battery 60 falling below the above-described predetermined amount of charge, the supercharging pressure by the electric supercharger 30 begins to decrease, while the supercharging pressure by the mechanical supercharger 10 begins to increase. At that time, the operating state control means 55 controls the engine 1 such that the engine load and the engine revolving speed change from point P to point Q in FIG. 4, i.e., in the direction of the arrow in FIG. 4, substantially along the equi-output (equi-horsepower) curve in FIG. 4, which is a curve where the engine output (engine horsepower) remains unchanged. In other words, the operating state control means 55 controls the engine 1, when transferring the supercharging source from the electric supercharger 30 to the mechanical supercharger 10, such that the engine output does not substantially change, thereby preventing a sharp change in vehicle speed, a change in ride feeling, and uncomfortableness felt by the driver.

Preferably, the line along which the engine load and the engine revolving speed change is precisely coincident with the equi-output curve in FIG. 4, but may be slightly deviated therefrom provided that this causes no sharp change in vehicle speed, no change in ride feeling, and no uncomfortableness felt by the driver.

The operating state control means 55 controls the transmission T to gradually increase its speed reduction ratio as the revolving speed of the engine 1 and the load of the engine 1 change along the equi-output curve. Since the transmission T is capable of continuously changing its speed reduction ratio, it is considered that no substantial uncomfortableness will be felt by the driver while the engine output and the engine revolving speed are changing.

The above description is based on the assumption that the transmission T of the vehicle has an automatic, stepless speed changing mode in which the reduction ratio is changed in a stepless manner while the driver-operated shift lever is in an automatic shift position. However, the transient control is also possible with a transmission having an automatic, stepwise speed changing mode in which the reduction ratio is changed in a stepwise manner while the shift lever is in the automatic shift position. In this case, the engine is preferably controlled such that the engine output and the engine revolving speed change precisely along the equi-output curve, or along a line as close to the equi-output line as possible, at every step of the automatic, stepwise speed changing mode.

While in the embodiment, transient control of the electric supercharger 30 and the mechanical supercharger 10 is described, in the system E of the engine 1, and the vehicle on which this system is mounted, various controls are possible using the remaining charge detecting means 51 for detecting the remaining amount of charge of the battery 60, and the supercharge control means 52 for adjusting the ratio between the supercharging pressure by the electric supercharger 30 and the supercharging pressure by the mechanical supercharger 10 based on the remaining amount of charge of the battery 60.

For example, the control system E may be configured such that, if, after the remaining amount of charge of the battery 60 falls below the predetermined amount of charge, the battery 60 is recharged, and the remaining amount of charge reaches or exceeds the predetermined amount of charge, the supercharging pressure by the electric supercharger 30 is increased, while the supercharging pressure by the mechanical supercharger 10 is reduced, and simultaneously, the transmission T is controlled such that the engine output and the engine revolving speed change along the equi-output curve in FIG. 4 in the direction opposite to the direction of the arrow.

In the embodiment, the exhaust bypass device 40 or wastegate valve device is electronically controlled so that it can be driven even while the supercharging pressure is low, and it can also be more precisely controlled. However, the wastegate valve device may be controlled by a pneumatic actuator, preferably using a vacuum pump to create a negative pressure.

In the embodiment, the engine 1 is a four-cycle gasoline engine for use in an automobile, but the present invention is applicable to other gasoline engines, as well as to diesel engines.

DESCRIPTION OF THE REFERENCE NUMERALS

1. Engine
2. Cylinder
3. Intake port
4. Intake passage
5. Throttle valve
6. Intake air cooling device
7. Second throttle valve
10. Mechanical supercharger
11. Mechanical compressor
12. Exhaust turbine
13. Exhaust port
14. Exhaust passage
15. Exhaust purifier
16. Muffler
20. Exhaust gas recirculation device
21. Exhaust gas recirculation passage
22. Exhaust gas recirculation valve
30. Electric supercharger
32. Electric compressor
33. Intake bypass passage
34. Intake bypass valve
40. Exhaust bypass device
41. Exhaust bypass passage
42. Exhaust bypass valve
50. ECU
51. Remaining charge detecting means
52. Supercharge control means
53. Intake bypass device control means
54. Exhaust bypass device control means
55. Operating state control means

What is claimed is:

1. An engine control device for controlling an engine including a combustion chamber, an intake passage, and an exhaust passage, the engine control device comprising:
    a dynamo-electric machine configured to generate electric power by rotation of the engine;
    a battery configured to store the electric power generated by the dynamo-electric machine;
    an electric supercharger including an electric compressor disposed in the intake passage and configured to supercharge intake air into the combustion chamber by the electric power stored in the battery;
    a mechanical supercharger including an exhaust turbine disposed in the exhaust passage and configured to be driven by exhaust gas in the exhaust passage, and a mechanical compressor disposed in the intake passage and configured to supercharge intake air into the combustion chamber;
    a remaining charge detector configured to detect a remaining amount of charge of the battery; and
    a supercharge controller configured to adjust a ratio between a supercharging pressure by the electric supercharger and a supercharging pressure by the mechanical supercharger according to the remaining amount of charge of the battery,
    wherein the supercharge controller is configured to determine a degree of opening of a exhaust bypass valve based on a difference between a target supercharging pressure of intake air and the supercharging pressure by the electric supercharger.

2. The engine control device of claim 1, wherein the engine further includes an exhaust bypass passage connecting portions of the exhaust passage upstream and downstream of the exhaust turbine, and an exhaust bypass valve configured to selectively open and close the exhaust bypass passage, the supercharge controller being configured to control a degree of opening of the exhaust bypass valve according to the remaining amount of charge of the battery.

3. The engine control device of claim 1, wherein the supercharge controller is configured to reduce the supercharging pressure by the electric supercharger and increase the supercharging pressure by the mechanical supercharger when the remaining amount of charge of the battery falls below a predetermined amount of charge while the electric supercharger is being activated.

4. The engine control device of claim 1, further comprising an operating state controller configured to control a revolving speed of the engine and a load of the engine with reference to an equi-output curve where an output of the engine does not change, while the ratio between the supercharging pressure by the electric supercharger and the supercharging pressure by the mechanical supercharger is changing.

5. A vehicle comprising:
the engine control device of claim 4;
an engine configured to be controlled by the engine control device; and
a transmission configured to change a speed reduction ratio of the output of the engine,
wherein the operating state controller is configured to control the speed reduction ratio as the revolving speed of the engine and the load of the engine change along the equi-output curve.

6. The engine control device of claim 2, wherein the supercharge controller is configured to reduce the supercharging pressure by the electric supercharger and increase the supercharging pressure by the mechanical supercharger when the remaining amount of charge of the battery falls below a predetermined amount of charge while the electric supercharger is being activated.

7. The engine control device of claim 2, further comprising an operating state controller configured to control a revolving speed of the engine and a load of the engine with reference to an equi-output curve where an output of the engine does not change, while the ratio between the supercharging pressure by the electric supercharger and the supercharging pressure by the mechanical supercharger is changing.

8. A vehicle comprising:
the engine control device of claim 7;
an engine configured to be controlled by the engine control device; and
a transmission configured to change a speed reduction ratio of the output of the engine,
wherein the operating state controller is configured to control the speed reduction ratio as the revolving speed of the engine and the load of the engine change along the equi-output curve.

9. The engine control device of claim 3, further comprising an operating state controller configured to control a revolving speed of the engine and a load of the engine with reference to an equi-output curve where an output of the engine does not change, while the ratio between the supercharging pressure by the electric supercharger and the supercharging pressure by the mechanical supercharger is changing.

10. A vehicle comprising:
the engine control device of claim 9;
an engine configured to be controlled by the engine control device; and
a transmission configured to change a speed reduction ratio of the output of the engine,
wherein the operating state controller is configured to control the speed reduction ratio as the revolving speed of the engine and the load of the engine change along the equi-output curve.

11. The engine control device of claim 6, further comprising an operating state controller configured to control a revolving speed of the engine and a load of the engine with reference to an equi-output curve where an output of the engine does not change, while the ratio between the supercharging pressure by the electric supercharger and the supercharging pressure by the mechanical supercharger is changing.

12. A vehicle comprising:
the engine control device of claim 11;
an engine configured to be controlled by the engine control device; and
a transmission configured to change a speed reduction ratio of the output of the engine,
wherein the operating state controller is configured to control the speed reduction ratio as the revolving speed of the engine and the load of the engine change along the equi-output curve.

* * * * *